United States Patent
Terasawa et al.

(10) Patent No.: US 12,524,792 B2
(45) Date of Patent: Jan. 13, 2026

(54) USED CAR SALES SYSTEM

(71) Applicant: TOYOTA JIDOSHA KABUSHIKI KAISHA, Toyota Aichi-ken (JP)

(72) Inventors: Yuko Terasawa, Meguro-ku Tokyo-to (JP); Makoto Kakuchi, Toyota (JP); Toshiaki Karasawa, Adachi-ku Tokyo-to (JP); Takeshi Higashi, Nagoya (JP); Yoshihiko Endo, Minato-ku Tokyo-to (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 133 days.

(21) Appl. No.: 18/538,175

(22) Filed: Dec. 13, 2023

(65) Prior Publication Data
US 2024/0202794 A1    Jun. 20, 2024

(30) Foreign Application Priority Data
Dec. 14, 2022    (JP) .................................. 2022-199605

(51) Int. Cl.
*G06Q 30/00* (2023.01)
*G06Q 30/0601* (2023.01)

(52) U.S. Cl.
CPC ..... *G06Q 30/0623* (2013.01); *G06Q 30/0641* (2013.01)

(58) Field of Classification Search
CPC .................................................. G06Q 30/0623
See application file for complete search history.

(56) References Cited

FOREIGN PATENT DOCUMENTS

| JP | 2002-269407 A | 9/2002 |
| JP | 2021-033411 A | 3/2021 |

OTHER PUBLICATIONS

Weng, Andrew, Eric Dufek, and Anna Stefanopoulou. "Battery passports for promoting electric vehicle resale and repurposing." Joule 7.5 (2023): 837-842.*

* cited by examiner

*Primary Examiner* — Kathleen Palavecino
(74) *Attorney, Agent, or Firm* — Dinsmore & Shohl LLP

(57) ABSTRACT

A management server performs a process including: in response to receiving a request to display a selection screen, acquiring vehicle body information and displaying a selectable vehicle type; in response to receiving vehicle type selection information, specifying a selected vehicle type, extracting a compatible battery, calculating an estimated range, extracting a performance-unachieved battery, and displaying a selectable battery and the performance-unachieved battery; and, in response to receiving battery selection information, calculating a sales fee and displaying the sales fee.

6 Claims, 3 Drawing Sheets

FIG.1
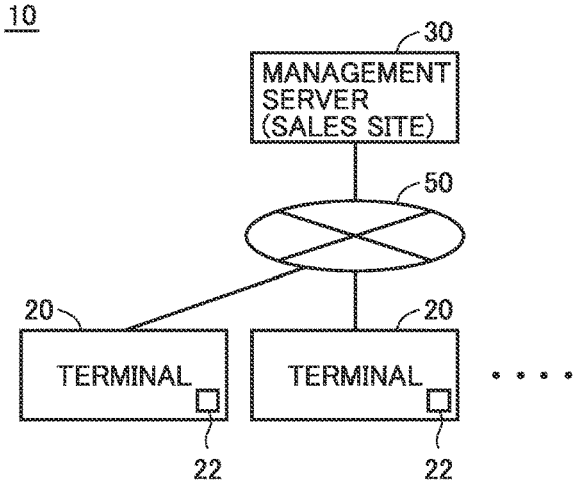
FIG.2
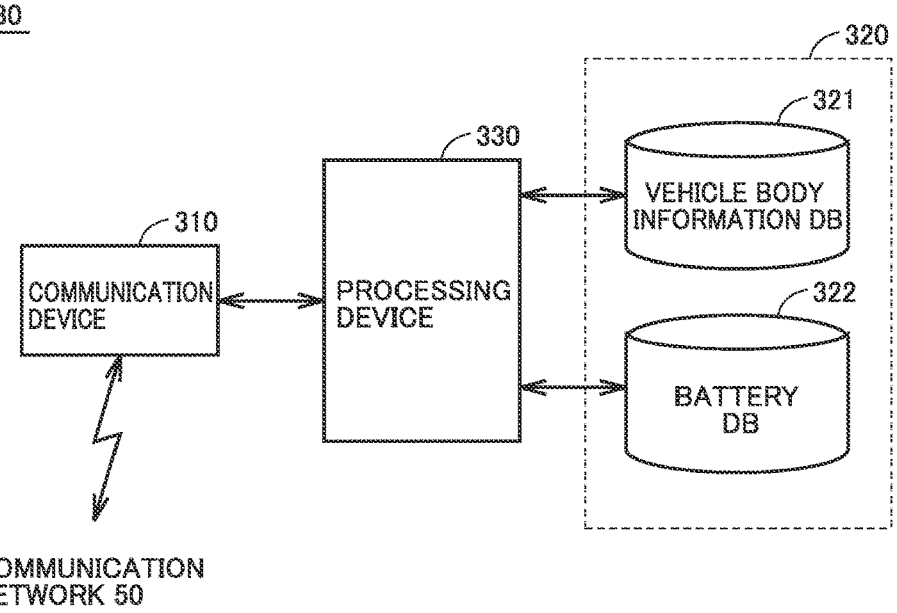
FIG.3
| BATTERY ID | PRODUCT NO. | COMPATIBLE VEHICLE TYPE | CURRENT FULL CHARGE CAPACITY | WEIGHT | PRICE |
|---|---|---|---|---|---|
| 001 | a-1 | A, B | C1 | W1 | P1 |
| 002 | a-2 | A, C | C2 | W2 | P2 |
| 003 | a-3 | A, D | C3 | W3 | P3 |
| 004 | a-4 | B, D | C4 | W4 | P4 |
| ⋮ | ⋮ | ⋮ | ⋮ | ⋮ | ⋮ |

FIG.5A

<SELECT VEHICLE TYPE>

| VEHICLE TYPE | PRICE (YEN) |
|---|---|
| A | L |
| B | M |
| C | N |
| ⋮ | ⋮ |

FIG.5B

<VEHICLE TYPE> A

<SELECT BATTERY>

| PRODUCT NO. | PRICE (YEN) | RANGE (km) |
|---|---|---|
| a-1 | P | X |
| a-2 | Q | Y |
| a-3 | R | NON-SELECTABLE BECAUSE PERFORMANCE IS NOT ACHIEVED |
| ⋮ | ⋮ | ⋮ |

USED CAR SALES SYSTEM

CROSS REFERENCE TO RELATED APPLICATIONS

This nonprovisional application is based on Japanese Patent Application No. 2022-199605 filed on Dec. 14, 2022 with the Japan Patent Office, the entire contents of which are hereby incorporated by reference.

BACKGROUND

Field

The present disclosure relates to a used car sales system.

Description of the Background Art

Japanese Patent Application Laid-Open No. 2002-269407 discloses a technology for providing information about the insurance of used cars and used cars to be sold to purchasers who desire to purchase used cars using a web site established in a server or the like on a network such as the Internet.

SUMMARY

A power storage device mounted on an electrically powered vehicle may be distributed separately due to a difference in the progress of deterioration from a vehicle body. Therefore, the vehicle body and the power storage device may be sold separately as used products. In the case of selling the used car by combining the used vehicle body and the used power storage device in such a selling mode using a web site or the like, a plurality of combinations of the vehicle body and the power storage device may be considered as compared with the case of selling a single vehicle. Therefore, it is required to quickly provide information about the used car desired by the purchaser from such a combination.

It is an object of the present disclosure to provide a used car sales system capable of quickly providing information about a used electrically powered vehicle that a purchaser wants to purchase.

A used car sales system according to an aspect of the present disclosure is a used car sales system used for resale of a power storage device and a vehicle body on which the power storage device can be mounted. The used car sales system includes: a management server that manages information about a plurality of vehicle bodies and information about a plurality of the power storage devices that can be mounted on at least any of the plurality of vehicle bodies; and a terminal that includes a display and is capable of communicating with the management server. When the management server receives, from the terminal, information indicating any vehicle body to be selected among the plurality of vehicle bodies, the management server causes the display to display first information about a plurality of the power storage devices that can be mounted on the vehicle body to be selected, and second information about a range provided by a combination of the vehicle body to be selected and the power storage device.

In this way, a plurality of power storage devices that can be mounted on a vehicle body to be selected are displayed together with respective ranges, which enables quick selection of a used electrically powered vehicle that a purchaser wants to purchase.

In an embodiment, the management server causes the display to display information about the power storage device that does not satisfy a condition for predetermined performance of an electrically powered vehicle in which the power storage device is combined with the vehicle body to be selected, the information about the power storage device that does not satisfy the condition being displayed in a non-selectable manner in which the power storage device cannot be selected.

In this way, a power storage device which can be mounted on the vehicle body but does not satisfy a condition for predetermined performance when combined with the vehicle body, is displayed in a non-selectable manner in which the power storage device cannot be selected. Therefore, it is possible to prevent selection of the power storage device and make the purchaser recognize that the power storage device cannot be selected, although it can be mounted on the vehicle body to be selected.

Further, in an embodiment, the management server specifies information about the power storage device that cannot be mounted on the vehicle body to be selected, as information that is not displayed.

In this way, it is possible to prevent display of information unnecessary for a purchaser.

Further, in an embodiment, the management server causes the display to display information about a price of a combination of the vehicle body to be selected and the power storage device, in addition to the first information and the second information.

In this way, in addition to the first information and the second information, the information about the price of the combination of the vehicle body to be selected and the power storage device is displayed by the display, and it is therefore possible to provide the purchaser with the information about the resale price of the electrically powered vehicle.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 1 is a diagram schematically showing an example of the overall configuration of a used car sales system;

FIG. 2 is a diagram showing an example of a configuration of a management server;

FIG. 3 is a diagram showing an example of information stored in a battery DB in a table format;

FIG. 5A is a diagram showing an example of a configuration of a display screen on a display of the terminal.

FIG. 5B is a diagram showing another example of a configuration of a display screen on a display of the terminal.

DESCRIPTION OF THE EMBODIMENTS

Figure 4:
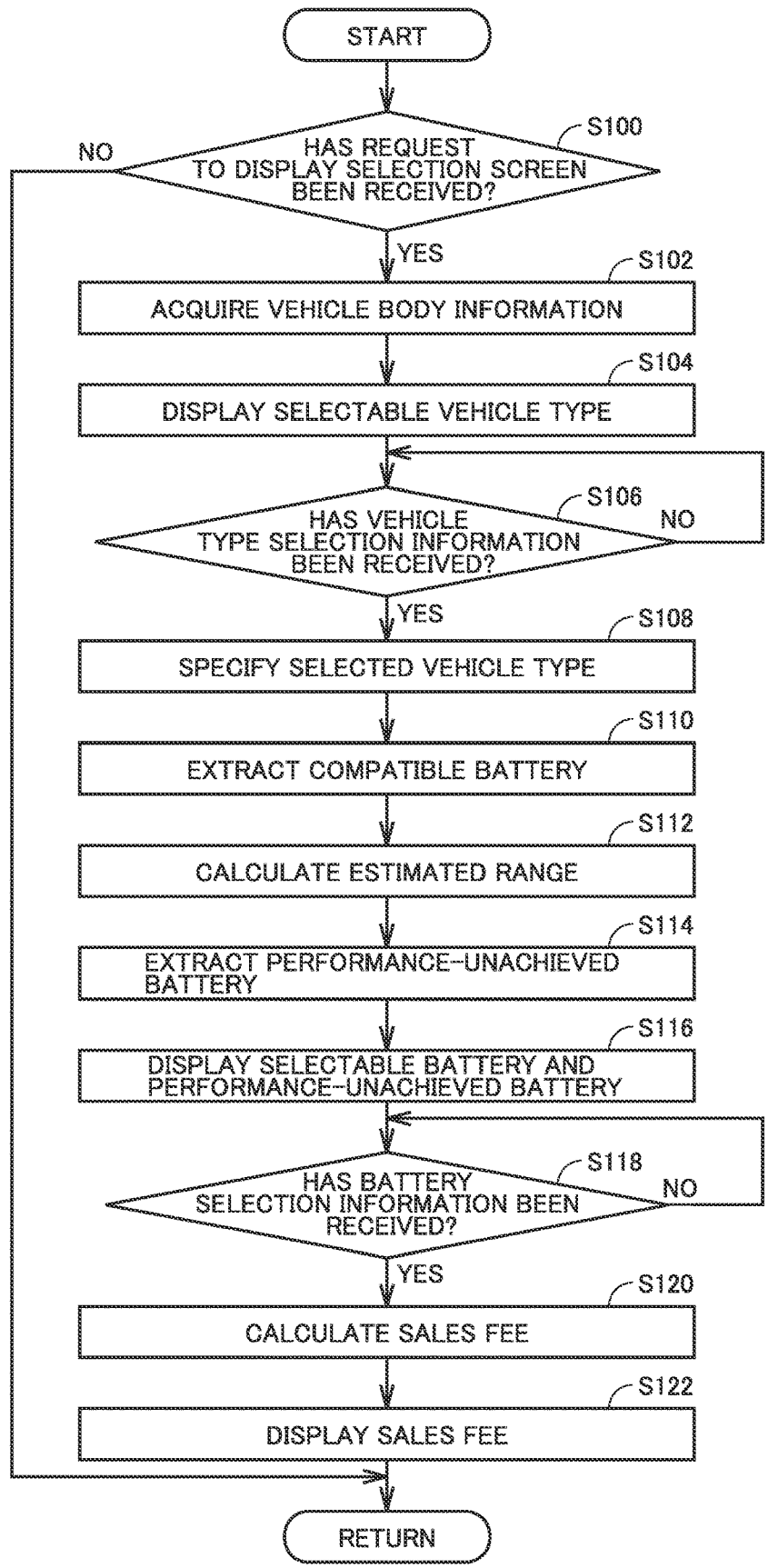
FIG. 4 is a flowchart illustrating an example of processing executed by a management server.

Hereinafter, embodiments of the present disclosure will be described in detail with reference to the accompanying drawings. In the drawings, the same or corresponding parts are denoted by the same reference numerals, and the description thereof will not be repeated.

FIG. 1 is a diagram schematically showing an example of the overall configuration of a used car sales system 10.

Referring to FIG. 1, used car sales system 10 includes a plurality of terminals 20 and a management server 30. Each of the plurality of terminals 20 and the management server 30 can communicate with each other via a communication network 50 such as the Internet.

The terminal 20 may be a mobile terminal such as a smartphone or a tablet, or may be a laptop PC (Personal Computer) or a desktop PC. The terminal 20 includes a control device, a storage device, a communication device, an input interface (not shown), and a display 22.

The management server 30 is a computer that performs management for consolidating and selling the used vehicle body and the used battery (power storage device) to be sold that are held by the used car store. The vehicle body is, for example, an electrically powered vehicle such as a battery electric vehicle or a hybrid electric vehicle, and corresponds to a vehicle portion excluding a battery. The battery is a power storage device that can be mounted on at least one of a plurality of types of vehicle bodies. The vehicle body and the battery are handled as separate objects to be sold. That is, the purchaser selects the vehicle body and the battery, and can purchase the used electrically powered vehicle by combining the selected vehicle body and the battery.

In the case where there are a plurality of used car shops, for example, the management server 30 acquires information of a vehicle body to be sold (manufacturing manufacturer, vehicle model name, model, age, vehicle weight, vehicle body price, and the like) and information of a battery to be sold (product number, compatible vehicle type, current full charge capacity, battery weight, battery price, etc.) from a computer (not shown) installed in each of the plurality of used car shops via the communication network 50. The management server 30 stores the acquired information.

The management server 30 has a function as a Web server. The management server 30 uses the stored information to post information about the vehicle body to be sold and information about the battery to be sold on the online sales site in a predetermined display mode. Further, the management server 30 executes a process (a payment process or the like) of selling the vehicle body to be sold, which is selected in the online sales site and has received the purchase request, and the battery.

FIG. 2 is a diagram showing an example of the configuration of the management server 30. Referring to FIG. 2, management server 30 includes a communication device 310, a storage device 320, and a processing device 330. The communication device 310 is configured to be capable of two-way communication with each terminal 20 through the communication network 50.

The storage device 320 includes a vehicle body database (hereinafter, "vehicle body database" is referred to as "vehicle body DB") 321 and a battery database (hereinafter, "battery database" is referred to as "battery DB") 322. The vehicle body DB 321 stores information and the like of a vehicle body to be sold and placed on an online sales site. The information of the vehicle body may include, for example, a driving method (e.g., whether or not the vehicle is a four-wheel drive) and presence or absence of various kinds of equipment in addition to the manufacturer, the vehicle type name, the model, the model year, the vehicle weight, and the vehicle body price described above. The battery DB 322 stores information and the like of a battery to be sold and listed in an online sales site. The battery information may include, for example, a manufacturing year, a manufacturing place, and various history information in addition to the product number, the compatible vehicle type, the current full charge capacity, the battery weight, and the battery price.

FIG. 3 is a table showing an example of information stored in the battery DB 322. As shown in FIG. 3, battery IDs are assigned to all batteries to be sold as identification information for identifying the batteries. The battery ID may be a manufacturing number or a serial number. Further, in the battery DB 322, a product number, a compatible vehicle type, a current full charge capacity, a battery weight, and a battery price are stored in association with the battery ID. For example, the product number "a-1", the compatible vehicle type "A, B", the current full charge capacity "C1", the battery weight "W1", and the battery price "P1" are stored in the battery DB 322 in association with each other with respect to the battery whose battery ID is "001". The compatible vehicle type "A, B" indicates that the battery whose battery ID is "001" is compatible with the vehicle type A and the vehicle type B.

Similarly, for the batteries whose battery IDs are "002", "003" and "004", as shown in FIG. 3, product numbers "a-2", "a-3" and "a-4", compatible vehicle types "A, C", "A, D" and "B, D", current full charge capacity "C2", "C3" and "C4", battery weight "W2", "W3" and "W4", and battery price "P2", "P3" and "P4" are associated with each other and stored in the battery DB 322.

The processing device 330 includes a CPU (Central Processing Unit), a memory (ROM (Read Only Memory) and RAM (Random Access Memory)), and an input/output buffer (both not shown). The CPU develops a program stored in the ROM into a RAM or the like and executes the program. The program stored in the ROM describes various kinds of processing executed by the processing device 330.

The processing device 330 acquires the information on the vehicle body to be sold and the information on the battery, which are listed in the online sales site, from the computer of each used car store via the communication network. The processing device 330 registers (stores) the acquired information on the vehicle body to be sold in the vehicle body DB 321, and registers the acquired information on the battery to be sold in the battery DB 322.

When connected to an online sales site using, for example, an application of the terminal 20 (i.e., when receiving a display request of the online sales site), the processing device 330 transmits information (image data, configuration information of the site, and the like) for displaying the online sales site to the terminal 20.

When the online sales site is displayed on the display 22 of the terminal 20, the user (purchasing desire person) of the terminal 20 can recognize the vehicle body or the battery to be sold. When the purchaser operates the input interface of the terminal 20 to complete the selection operation for selecting the vehicle body and the battery, the terminal 20 transmits information indicating the selection operation to the management server 30. The management server 30 generates display information using information indicating the received selection operation, and transmits the generated display information to the terminal 20. The terminal 20 changes the display content using the display information received from the management server 30. By sending and receiving such information between the terminal 20 and the management server 30, a purchaser selects a vehicle body and a battery to be sold, and performs a process of purchasing an electrically powered vehicle in which the selected vehicle body and battery are combined.

In the used car sales system 10 as described above, since the battery is distributed separately due to the difference in the progress of deterioration with the vehicle body, a sales form in which the vehicle body and the battery are sold separately as used products may be considered as described above. In the case of selling the older vehicle body or the older battery in such a selling mode using an online selling site or the like, a plurality of combinations of the vehicle body and the battery may be considered as compared with the case of selling the vehicle by a single vehicle. Therefore, it is required to quickly provide information about the used car desired by the purchaser from such a combination.

Therefore, in the present embodiment, when the management server 30 receives information indicating any vehicle body to be selected, among the plurality of vehicle bodies, from the terminal 20, the management server 30 causes the display 22 of the terminal 20 to display the first information about the plurality of batteries which can be mounted on the vehicle body to be selected and the second information about the range when the vehicle body to be selected and the power storage device are combined.

By doing so, since a plurality of batteries that can be mounted on the vehicle body to be selected are displayed together with the range, it is possible to quickly select the used electrically powered vehicle desired by the purchaser. Note that the "range" refers to the distance that can be travelled when the mounted battery is in a fully charged state (i.e., in one charge).

Hereinafter, an example of processing executed by the management server 30 will be described with reference to FIG. 4. FIG. 4 is a flowchart showing an example of processing executed by the management server 30 (specifically, the processing device 330). The series of processing shown in this flowchart is repeatedly executed by the management server 30 at predetermined intervals.

In step (hereinafter referred to as step S) 100, the management server 30 determines whether or not a request to display a selection screen is received. The selection screen is a screen for the purchaser to select the vehicle body and the battery at the used car sales site. The terminal 20 transmits a connection request to the management server 30 when, for example, an application is started and an operation of a purchase requester for connecting to an online sales site is accepted. When receiving the connection request, the management server 30 determines that the display request of the selection screen has been received. When it is determined that the display request of the selection screen has been received (YES in S100), the process proceeds to S102.

In S102, the management server 30 acquires vehicle body information. The management server 30 acquires information (vehicle body information) of the vehicle body to be sold from the vehicle body DB 321. The management server 30 registers flag information indicating whether or not each of a plurality of vehicle IDs is to be sold in the vehicle body DB 321 in association with each other, and acquires vehicle body information about the vehicle ID corresponding to the flag in the ON state as vehicle body information to be sold. The management server 30 acquires at least the manufacturer, the vehicle type name, the model, the age, the vehicle weight, and the vehicle body price as the vehicle body information. After that, the process proceeds to S104.

In S104, the management server 30 displays a selectable vehicle type. For example, when a manufacturer is designated by a purchaser, the management server 30 specifies all the vehicle types corresponding to the designated manufacturer included in the vehicle body information as selectable vehicle types, sets display information for displaying the specified selectable vehicle types, and transmits the set display information to the terminal 20. The terminal 20 displays the selectable vehicle type on the display 22 using the display information. After that, the process proceeds to S106.

In S106, the management server 30 determines whether or not the vehicle type selection information has been received. When any one of the selectable vehicle types displayed on the display 22 is selected in response to an operation of the purchaser, the terminal 20 transmits information indicating the selected vehicle type to the management server 30 as vehicle type selection information. When it is determined that the vehicle type selection information is received (YES in S106), the process proceeds to S108.

In S108, the management server 30 specifies the selected vehicle type. The management server 30 identifies the selected vehicle type using the received vehicle type selection information. Then, the process proceeds to S110.

In S110, the management server 30 extracts a compatible battery. The management server 30 extracts a battery compatible with the specified selected vehicle type from the battery information stored in the battery DB 322. For example, the management server 30 searches for the compatible vehicle type of the battery information and extracts the compatible battery by extracting the battery ID including the same vehicle type as the selected vehicle type as the compatible vehicle type. After that, the process proceeds to S112.

In S112, the management server 30 calculates an estimated range. The management server 30 calculates an estimated range when the battery extracted as the compatible battery is installed in the selected vehicle type. For example, the management server 30 calculates the vehicle weight after the battery is mounted from the extracted battery weight of the battery and the vehicle weight of the selected vehicle type, and calculates the maximum value of the travelable distance in one charge as the estimated range using the calculated vehicle weight and the current full charge capacity of the battery. As a method of calculating the maximum value of the travelable distance, for example, there is a method of calculating the amount of power consumption per distance at the time of steady traveling from the calculated vehicle weight, and calculating the travelable distance when the battery is charged until the current full charge capacity is reached as the estimated range. A well-known technique may be used as a method of calculating the estimated range, and the method described above is not particularly limited. For example, a map, a function, or the like indicating the relationship between the vehicle weight, the current full charge capacity, and the estimated range may be adapted in advance by experiment or the like, and the management server 30 may calculate the estimated range from the calculated vehicle weight and the current full charge capacity. Alternatively, it may be calculated in consideration of the output of the motor serving as a drive source. After that, the process proceeds to S114.

In S114, the management server 30 extracts a performance-unachieved battery. For example, the management server 30 extracts a battery whose estimated range is equal to or less than a threshold value among the batteries extracted as the compatible battery as a performance-unachieved battery. For example, the management server 30 may extract a battery whose value obtained by adding the vehicle body weight and the battery weight exceeds a threshold value as a performance-unachieved battery. Alternatively, the management server 30 may extract a battery whose ratio of the battery weight to the vehicle weight exceeds or falls below a predetermined range as a performance-unachieved battery. Further, for example, the management server 30 may extract a performance-unachieved battery when the current full charge capacity is equal to or less than a threshold value set according to the vehicle type. After that, the process proceeds to S116.

In S116, the management server 30 displays the selectable battery and the performance-unachieved battery. The management server 30 sets display information for displaying the selectable battery and the performance-unachieved battery using the information about the selectable battery and the information about the performance-unachieved battery, and transmits the set display information to the terminal 20. The terminal 20 displays the selectable battery and the performance-unachieved battery on the display 22 using the display information. At this time, the terminal 20 displays the selectable battery as the purchase target so as to be selectable, and displays the performance-unachieved battery as the purchase target so as not to be selectable. An example of the configuration displayed on the display 22 of the terminal 20 will be described later. After that, the process proceeds to S118.

In S118, management server 30 determines whether or not battery selection information is received. When any one of the selectable batteries displayed on the display 22 is selected in response to an operation of the purchaser, the terminal 20 transmits information indicating the selected battery to the management server 30 as battery selection information. When it is determined that the battery selection information is received (YES in S118), the process proceeds to S120.

In S120, the management server 30 calculates a sales fee. The management server 30 calculates an amount obtained by adding the battery price of the selected battery to the vehicle body price of the selected vehicle body as a sales fee. Then, the process proceeds to S122.

In S122, the management server 30 displays the calculated sales fee. The management server 30 sets display information for displaying the sales fee using the information about the calculated sales fee, and transmits the set display information to the terminal 20. The terminal 20 displays the sales fee on the display 22 using the display information. Thereafter, the processing ends.

When it is determined that the display request of the selection screen is not received (NO in S100), this processing is terminated. When it is determined that the vehicle type selection information is not received (NO in S106), the process returns to S106. When it is determined that the battery selection information is not received (NO in S118), the process returns to S118.

An example of the operation of the management server 30 of the used car sales system 10 based on the above-described structure and flowchart will be described with reference to FIGS. 5A and 5B. FIG. 5A is a diagram showing an example of a configuration of a display screen on the display 22 of the terminal 20.

For example, in the case where the purchaser is connected to the used car sales site by activating an application for the terminal 20, a connection request is transmitted from the terminal 20 to the management server 30.

When the management server 30 receives the connection request as a display request of the selection screen (YES in S100), vehicle body information is acquired from the vehicle body DB 321 (S102). Then, information for displaying the selectable vehicle type on the display 22 of the terminal 20 is generated and transmitted to the terminal 20 (S104). When the terminal 20 performs display using the received information, a selection screen is displayed as shown in FIG. 5A. On the selection screen, the vehicle type name to be sold and the price of the vehicle body are displayed in a table format. In FIG. 5A, "A", "B" and "C" are displayed as the vehicle types, and "L", "M" and "N" are displayed as the respective prices. Although only three types of vehicles are shown as an example in FIG. 5A, the number of vehicles to be displayed is not limited to three types of vehicles, and four or more types of vehicles may be displayed, or the number of vehicles to be displayed may be limited by specifying manufacturers, age, or the like. The displayed vehicle types may be different from each other, or a plurality of the same vehicle types may be displayed.

When the purchaser performs an operation of selecting one of a plurality of vehicle types displayed on the selection screen, information indicating the selected vehicle type is transmitted from the terminal 20 to the management server 30 as vehicle type selection information. When the vehicle type selection information is received by the management server 30 (YES in S106), the vehicle type selected by the purchaser is specified by using the received vehicle type selection information (S108). When the vehicle type is specified, a compatible battery compatible with the specified vehicle type is extracted (S110). Then, the estimated range when the extracted compatible battery is installed in the selected vehicle type is calculated (S112). Further, a performance-unachieved battery is extracted using the battery weight, the estimated range, and the like (S114). Then, the selectable battery and the performance-unachieved battery extracted are displayed on the display 22 of the terminal 20 (S116).

FIG. 5B shows an example of the configuration of the display screen when, for example, the vehicle type "A" is selected. As shown in FIG. 5B, on the display 22 of the terminal 20, a battery that can be mounted on the vehicle type "A" is displayed as a selection candidate. In FIG. 5B, product numbers "a-1," "a-2," and "a-3" are displayed. For the battery having the product number "a-1", the price "P" and the travelable distance "X" are displayed in association with each other. Similarly, for the battery having the product number "a-2", the price "Q" and the travelable distance "Y" are displayed in association with each other. On the other hand, for the battery having the product number "a-3", the price "R" is displayed in association with the battery, and character information indicating "non-selectable because the performance is not achieved" is displayed in the area on the right side of the price information. On the other hand, character information is displayed by being surrounded by a broken-line frame in a portion of the battery of the product number "a-3". In this way, the battery having the product number "a-3" is displayed such that it is visually recognizable that the product number "a-3" is in an unselectable state by including a display partially different from the other selectable batteries. At this time, the battery of the product number "a-3" is set as, for example, an unselectable option, and is processed so as not to be in a selected state as a purchase target even when an operation of selecting the product number "a-3" is performed by a purchaser at the terminal 20.

When an operation of selecting a battery (for example, a battery of product number "a-1") is performed in the terminal 20, information of the battery to be selected is transmitted from the terminal 20 to the management server 30 as battery selection information. When the management server 30 receives the battery selection information (YES in S118), a value (for example, L P) obtained by adding the vehicle body price of the selected vehicle type and the battery price of the selected battery is calculated as a sales fee (S120). Then, information for displaying the calculated sales fee is transmitted to the terminal 20 (S122). When the terminal 20 receives the information from the management server 30, character information indicating the calculated sales fee is displayed on the display 22.

As described above, according to the used car sales system 10 of the present embodiment, since a plurality of batteries that can be mounted on the vehicle body to be selected are displayed together with the estimated range, the used vehicle desired by the purchaser can be quickly selected. Accordingly, it is possible to provide a used car sales system that enables a purchaser to quickly provide information about a desired used electrically powered vehicle.

Further, a battery whose performance has not been reached when the battery is combined even if the battery is mountable on the vehicle body is displayed in a non-selectable manner in which the battery cannot be selected. Therefore, the selection of the battery can be suppressed, and the purchaser can recognize that the battery can be mounted on the vehicle body but cannot be selected.

Further, in addition to the information (first information) about the battery mountable on the vehicle body to be selected and the information (second information) about the estimated range when the vehicle body to be selected and the battery are combined, the information about the price when the vehicle body to be selected and the power storage device are combined is displayed, whereby the price of the used electrically powered vehicle desired by the purchaser can be recognized.

Further, a battery that cannot be mounted on the vehicle body to be selected is set as a non-display target. Therefore, it is possible to suppress the display of unnecessary information for the purchaser and to quickly select the used electrically powered vehicle desired by the purchaser.

Hereinafter, modified examples will be described.

In the above-described embodiment, the screen for selecting the vehicle type as shown in FIG. 5A is displayed, and the screen for selecting the battery as shown in FIG. 5B is displayed after the vehicle type is selected; however, the screen may be divided into two regions, i.e., a left region and a right region or an upper region and a lower region, and one region may indicate a screen for selecting the vehicle type and the other region may indicate a screen for selecting the battery. The screen for selecting the battery may be updated every time the selection of the vehicle type is changed. This makes it possible to quickly display the battery corresponding to the changed vehicle type while facilitating the change of the vehicle type.

Further, in the above-described embodiment, the case where the vehicle type and the price are displayed on the screen for selecting the vehicle type as shown in FIG. 5A has been described as an example; however, at least any of the manufacturer, the model year, the model, and the vehicle weight may be displayed in addition to the vehicle type and the price.

Further, in the above-described embodiment, the case where the product number, the price, and the travelable distance are displayed on the screen for selecting the battery as shown in FIG. 5B has been described as an example, but for example, in addition to the product number, the price, and the travelable distance, at least one of the compatible vehicle type, the current full charge capacity, and the battery weight may be displayed.

The above-described modified examples may be implemented by appropriately combining all or a part of them.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A used car sales system used for resale of a power storage device and a vehicle body on which the power storage device are mounted, the used car sales system comprising:
   a management server that manages information about a plurality of vehicle bodies and information about a plurality of the power storage devices that are mounted on at least any of the plurality of vehicle bodies; and
   a terminal that includes a display and is configured to communicate with the management server, wherein
   when the management server receives, from the terminal, information indicating any vehicle body to be selected among the plurality of vehicle bodies, the management server causes the display to display first information about a plurality of the power storage devices that are mounted on the vehicle body to be selected, and second information about a range provided by a combination of the vehicle body to be selected and the power storage device,
   the terminal displays content using information received from the management server, and
   the management server repeatedly executes processing including the display of the first information and the display of the second information at predetermined intervals.

2. The used car sales system according to claim 1, wherein the management server causes the display to display the information about the power storage device that does not satisfy a condition for predetermined performance of an electrically powered vehicle in which the power storage device is combined with the vehicle body to be selected, the information about the power storage device that does not satisfy the condition being displayed in a non-selectable manner in which the power storage device cannot be selected.

3. The used car sales system according to claim 1, wherein the management server specifies the information about the power storage device that cannot be mounted on the vehicle body to be selected, as information that is not displayed.

4. The used car sales system according to claim 1, wherein the management server causes the display to display the information about a price of a combination of the vehicle body to be selected and the power storage device, in addition to the first information and the second information.

5. The used car sales system according to claim 1, wherein the management server: registers flag information indicating whether or not each of a plurality of identifiers is to be sold in a vehicle body database in association with each other; and acquires vehicle body information about one of the vehicle identifiers from the plurality of vehicle identifiers that corresponds to a flag in an ON state.

6. The used car sales system according to claim 1, wherein the terminal divides the display for selecting a vehicle type and selecting the battery into two regions, and the display for selecting the battery in one of the two regions is updated in response to selection of the vehicle type being changed in an other of the two regions.

* * * * *